(12) United States Patent
Tabota

(10) Patent No.: US 6,807,859 B2
(45) Date of Patent: Oct. 26, 2004

(54) ACCELERATION SENSOR

(75) Inventor: Jun Tabota, Toyama-ken (JP)

(73) Assignee: Murata Manufacturing Co, Ltd., Kyoto (JP)

( * ) Notice: Subject to any disclaimer, the term of this patent is extended or adjusted under 35 U.S.C. 154(b) by 0 days.

(21) Appl. No.: 10/378,605

(22) Filed: Mar. 5, 2003

(65) Prior Publication Data

US 2003/0172733 A1 Sep. 18, 2003

(30) Foreign Application Priority Data

Mar. 5, 2002 (JP) ........................................ 2002-058126

(51) Int. Cl.$^7$ ............................................. G01P 15/09
(52) U.S. Cl. .................... 73/514.34; 310/332
(58) Field of Search .......................... 73/514.16, 514.39; 310/323.06, 332, 311

(56) References Cited

U.S. PATENT DOCUMENTS

| | | | | |
|---|---|---|---|---|
| 4,431,935 A | * | 2/1984 | Rider | 310/331 |
| 5,490,422 A | | 2/1996 | Tabota et al. | 73/514.34 |
| 5,515,725 A | | 5/1996 | Tabota et al. | 73/514.34 |
| 5,914,556 A | * | 6/1999 | Tabota et al. | 310/328 |
| 6,050,144 A | * | 4/2000 | Otsuchi et al. | 73/514.34 |
| 6,360,603 B1 | | 3/2002 | Tabota | 73/514.34 |
| 2002/0139189 A1 | * | 10/2002 | Ogiura | 73/514.34 |

FOREIGN PATENT DOCUMENTS

| | | |
|---|---|---|
| JP | 6-273439 | 9/1994 |
| JP | 2000-121661 | 4/2000 |

* cited by examiner

*Primary Examiner*—John E. Chapman
(74) *Attorney, Agent, or Firm*—Keating & Bennett, LLP

(57) ABSTRACT

An acceleration sensor includes a piezoelectric element and a support member for supporting the piezoelectric element at both longitudinal ends thereof. The piezoelectric element includes a laminate of at least two piezoelectric layers. Each of the at least two piezoelectric layers includes three longitudinally aligned regions separated at two borders where stress is inverted in the longitudinal direction of the piezoelectric element when acceleration is applied. Cells, each formed of a respective region, are polarized in the same direction of thickness in each of the two external piezoelectric layers. Electrodes are arranged so that the three cells in the one piezoelectric layer are serially connected, the three cells in the other piezoelectric layer are serially connected, and then the three serially connected cells in the one piezoelectric layer and the three serially connected cells in the other piezoelectric layer are connected in parallel. Electrodes are routed out to the different longitudinal ends of the piezoelectric element.

11 Claims, 11 Drawing Sheets

↔ TENSILE STRESS
⋈ COMPRESSIVE STRESS

↔ TENSILE STRESS
>—< COMPRESSIVE STRESS

ACCELERATION

G ↓

ACCELERATION

G ↓

ACCELERATION SENSOR

BACKGROUND OF THE INVENTION

1. Field of the Invention

The present invention relates an acceleration sensor including a piezoelectric element.

2. Description of the Related Art

Japanese Unexamined Patent Application Publication No. 6-273439 (corresponding to counterpart U.S. Pat. Nos. 5,515,725 and 5,490,422) discloses an acceleration sensor including a piezoelectric ceramic. Each of two piezoelectric ceramic layers, bonded together, includes three longitudinally aligned regions at two borders at which stress is inverted in the longitudinal direction of the layers when acceleration is applied thereto. These three regions are connected in parallel, and then the two layers are connected in series. FIG. 8A illustrates a charge that is generated when an acceleration G acts on the acceleration sensor, and FIG. 8B is a circuit diagram of the acceleration sensor.

Japanese Unexamined Patent Application Publication No. 2000-121661 (corresponding to counterpart U.S. Pat. No. 6,360,603) discloses another acceleration sensor. Each of two piezoelectric ceramic layers, bonded together, includes three longitudinally aligned regions separated at two borders at which stress is inverted in the longitudinal direction of the layers when acceleration is applied thereto. These three regions are connected in parallel, and then the two layers are connected in parallel. FIG. 9A illustrates a charge that is generated when an acceleration G acts on the acceleration sensor, and FIG. 9B is a circuit diagram of the acceleration sensor.

In the acceleration sensor shown in FIGS. 8A and 8B, cells (1) through (3) in one layer are connected in parallel and cells (4) through (6) in the other layer are connected in parallel. In the acceleration sensor shown in FIGS. 9A and 9B, cells (1) through (6) in the two layers are connected in parallel. In these arrangements, voltages generated in the cells are not summed. Sensitivity to the voltage generated in each layer is low, and the performance of these acceleration sensors is not high enough in applications where high sensitivity is required. Since all six cells (1) through (6) are connected in parallel in the acceleration sensor shown in FIGS. 9A and 9B, the voltage sensitivity thereof is half the voltage sensitivity provided by the acceleration sensor shown in FIGS. 8A and 8B.

To increase the voltage sensitivity, the gain of a voltage amplifier connected to the sensor must be increased. If the gain of the amplifier is increased, a noise component applied to the amplifier is also amplified. Also, the S/N ratio is degraded. Increasing the gain of the voltage amplifier does not serve the purpose of measuring a small acceleration.

In an acceleration sensor including a piezoelectric ceramic, no noise is generated from the piezoelectric ceramic itself. The sources of noise include external noise ingressing between the sensor and the input terminal of a circuit thereof, and internal noise responsive to input conversion voltage noise generated at an input stage of an operational amplifier defining the amplifier.

These noises will now be discussed with reference to a charge amplifier shown in FIG. 10 and a voltage amplifier shown in FIG. 11.

The sensor S here has voltage sensitivity Vs, charge sensitivity Qs, and capacitance Cs. It is well known that the relationship of $Qs = Vs \times Cs$ holds. Overall gains G of the two amplifiers are listed in Table 1. In the charge amplifier, the gain G is proportional to the charge sensitivity Qs. In the voltage amplifier, the gain is proportional to the voltage sensitivity Vs.

TABLE 1

| Circuit type | Gain G | External noise voltage (× Vn) | Internal noise voltage (× En) | G converted external noise (× Vn) | G converted internal noise (× En) |
|---|---|---|---|---|---|
| Charge amplifier | $Qs/C1$ | $Cc/C1$ | $(Cs + C1)/C1$ | $Cc/Qs$ | $(Cs + C1)/Qs = \{(Cs + C1)/Cs\}/Vs$ |
| Voltage amplifier | $Vs = Qs/Cs$ | $Cc/Cs$ | 1 | $Cc/Qs$ | $1/Vs$ |

The external noise Vn is now considered. The external noise Vn is electrostatically coupled through capacitance Cc to a line running between a sensor S and an input terminal of an amplifier OP, and the magnitude of noise is thus represented by Vn. The external noise Vn appears as Von after being amplified through the amplifier. Since the polarity of noise is not important, all noises are expressed in absolute values in Table 1.

In the charge amplifier, a coupling capacitance Cc and a feedback capacitance C1 form an inverting amplifier. The external noise voltage has a magnitude that is obtained by multiplying Vn by gain (Cc/C1). In the voltage amplifier, noise is voltage divided by a coupling capacitance Cc and capacitance Cs of a sensor, and is then output through a voltage follower.

If G converted noise that represents the magnitude of noise with reference to the level G is defined by the reciprocal of the S/N ratio, the G converted noise becomes a noise voltage/G gain. For example, if the G converted noise is 100 mG, noise as large as 100 mG is continuously generated even if no acceleration appears in the output of the circuit. An acceleration below that level cannot be measured. The G converted noise in each circuit is listed in Table 1. The G converted external noise is not related to the circuit type. The larger the charge sensitivity Qs, the smaller the G converted external noise, and the smaller acceleration is measured.

Table 1 lists internal noise voltage. Internal noise En is generated at a positive input terminal of an operational amplifier OP. A non-inverting amplifier is defined by a capacitance Cs of the sensor S and the feedback capacitance C1, and the output thereof is obtained by multiplying En by the resulting gain. Since the voltage amplifier is a voltage follower of gain one, En is directly output. The G converted internal noise is obtained by dividing noise voltage Von by G gain Vos as listed in Table 1. The G converted internal noise is not related to the circuit type. The larger the voltage sensitivity Vs, the smaller the G converted internal noise, and the smaller acceleration that is measured.

A sensor having a large charge sensitivity and a large voltage sensitivity is a good sensor. The product Qs·Vs/2 of the charge sensitivity and voltage sensitivity corresponds to energy Es generated by acceleration. To increase the energy Es, the sensor must be large in size. The external noise here depends on the layout on a printed circuit board, and the internal noise depends on an amplifier characteristic of an operational amplifier in use. Depending on the status of a host apparatus of the sensor, more weight is attached to one of the charge sensitivity Qs and the voltage sensitivity Vs than the other while the energy Es, which is the product of the charge sensitivity and the voltage sensitivity, is maintained. The above-disclosed sensors with the large charge sensitivity thereof are appropriate for use in applications where external noise level is high, but are not appropriate for use in applications where internal noise level is high because of the small voltage sensitivity thereof.

SUMMARY OF THE INVENTION

In order to overcome the problems described above, preferred embodiments of the present invention provide an acceleration sensor which increases a voltage sensitivity without reducing energy, which is equal to the product of charge sensitivity and voltage sensitivity, as much as possible, and which is appropriate in an operating environment where internal noise is high in level.

An acceleration sensor of a preferred embodiment of the present invention includes a piezoelectric element and a support member for supporting the piezoelectric element at both longitudinal ends thereof. The piezoelectric element includes a laminate of at least two piezoelectric layers. Each of the least two external piezoelectric layers of the piezoelectric element includes three longitudinally aligned regions separated at two borders where stress is inverted in the longitudinal direction of the piezoelectric element when acceleration is applied. Each of a plurality of cells defined by a respective region is polarized in the same direction of thickness in each of the two external piezoelectric layers. Electrodes are arranged on the top and bottom major surfaces and between the layers of the piezoelectric element so that the three longitudinally aligned cells are electrically connected in series.

The acceleration sensor of preferred embodiments of the present invention including a serial electrical connection of the three cells in the at least two external piezoelectric layers in the longitudinal direction presents a voltage sensitivity that is relatively higher than a conventional sensor in which the cells are connected in parallel. Although a charge sensitivity decreases, the energy equal to the product of the charge sensitivity and the voltage sensitivity suffers from no significant change as in the conventional sensor. The voltage sensitivity is thus increased while a decrease in the generated energy is controlled. Thus, preferred embodiments of the present invention provide an acceleration sensor that is appropriate for use in applications where internal noise is high.

The three cells in the at least two external piezoelectric layers or six cells in the at least two piezoelectric layers are serially connected. If an insulation resistance between electrodes in any particular cell is degraded, the remaining cells maintain the performance thereof. The entire sensor is thus less sensitive to individual cell failure. The thickness of the piezoelectric layer is reduced and sensitivity is increased as the degree of required insulation is accordingly alleviated.

In the conventional acceleration sensor, three separate cells arranged in the longitudinal direction are inverted in polarization between two adjacent cells. To polarize the sensor, three external electrodes are arranged for three cells, voltages for the three cells for polarization are applied, and electrodes for connecting the external electrodes are then arranged. In the acceleration sensor of preferred embodiments of the present invention, three cells in each of the at least two piezoelectric layers are polarized in the same direction. There is no need for inverting the polarization direction in the longitudinal direction. In the production of the sensor, the electrodes are manufactured in their final shape. The polarization process and the electrode formation process are thus simplified. In addition, manufacturing costs are reduced.

The piezoelectric element of the present invention is not limited to a two-layer structure. The piezoelectric element may include two or more layers in the structure thereof.

The polarization direction and the electrode structure may have various particular conditions. Preferably, all cells of the two external piezoelectric layers are polarized in the same direction. Each of the electrodes on the top and bottom major surfaces of the piezoelectric element includes two longitudinally aligned portions separated at one of the two borders. The electrode between the piezoelectric layers of the piezoelectric element includes two longitudinally aligned portions separated at the other of the two borders. At least one of the electrodes on the top and bottom major surfaces is lead out to one of the longitudinal ends of the piezoelectric element, and the electrode between the piezoelectric layers is lead out to the other of the longitudinal ends of the piezoelectric element.

In this case, the three cells in each of the two layers are serially connected, and then, two layers are connected in parallel. This arrangement results in a voltage sensitivity which is about 1.5 times that of the conventional sensor shown in FIG. 8A, and about 3 times that of the conventional sensor shown in FIG. 9A. Although this arrangement has a charge sensitivity which is about 0.6 times that of the conventional sensor shown in FIG. 8A, and about 0.3 times that of the conventional sensor shown in FIG. 9A, the energy remains substantially unchanged, namely, about 0.9 times that of the conventional sensor. The voltage sensitivity is increased without significantly reducing the energy. An acceleration sensor that is appropriate for use in applications where internal noise level is high is thus provided. Since the polarization directions of all cells are the same, the manufacturing process of the sensor is simplified, and the manufacturing costs are reduced.

The polarization direction and the electrode structure may have other particular conditions. Preferably, the cell of the one piezoelectric layer and the cell of the other piezoelectric layer are polarized in opposite directions. The electrode on the top major surface of the piezoelectric element preferably includes two longitudinally aligned portions separated at one of the two borders. The electrode on the bottom major surface of the piezoelectric element preferably includes two longitudinally aligned portions separated at the other of the two borders. The interlayer electrode of the piezoelectric element includes three longitudinally aligned regions separated at the two borders. The electrode on the top major surface is lead out to one of the longitudinal ends of the piezoelectric element, and the electrode on the bottom major surface is lead out to the other of the longitudinal ends.

In this arrangement, six cells in the at least two piezoelectric layers are serially connected. This arrangement results in a voltage sensitivity which is about 3 times that of the conventional sensor shown in FIG. 8A, and about 6 times that of the conventional sensor shown in FIG. 9A. Although this arrangement has a charge sensitivity which is about 0.3 times that of the conventional sensor shown in FIG. 8A, and about 0.15 times that of the conventional sensor shown in FIG. 9A, the energy remains substantially unchanged, namely, about 0.9 times that of the conventional sensor. The voltage sensitivity is heightened without significantly reducing the energy. An acceleration sensor that is appropriate for use in applications where internal noise level is high is thus provided.

Since the polarization directions of the three cells in each layer are the same, the manufacturing process of the sensor is simplified, and the manufacturing costs are reduced.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
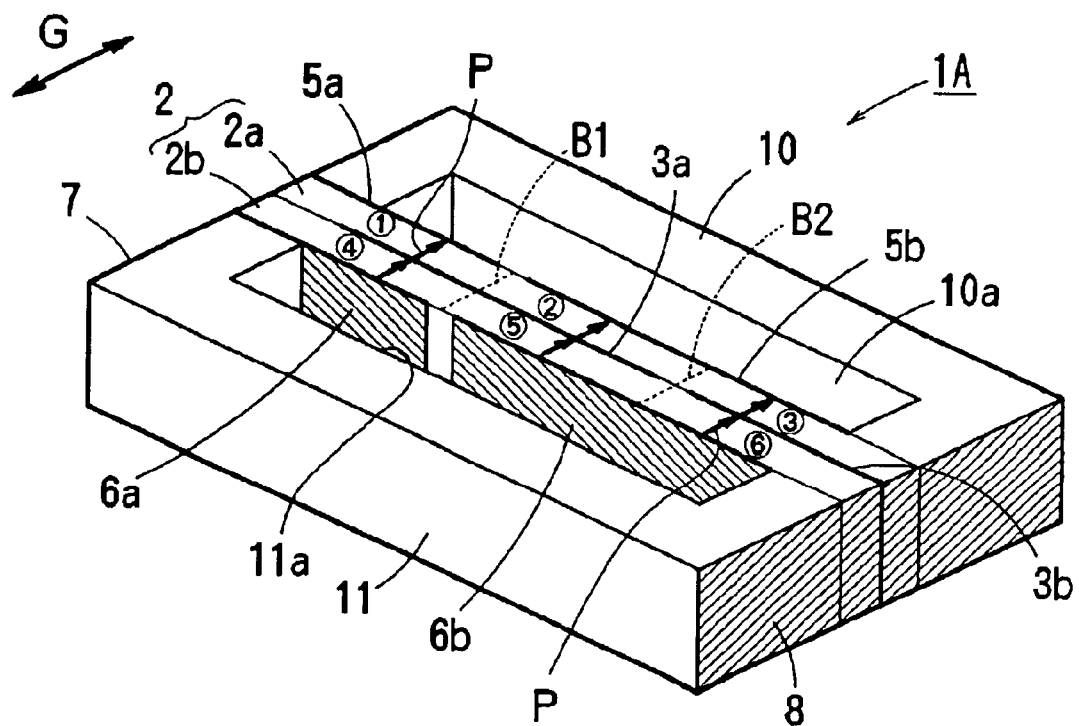
FIG. 1 is a perspective view of the acceleration sensor in accordance with a first preferred embodiment of the present invention.

FIGS. 1 through 4 illustrate the acceleration sensor 1A in accordance with a first preferred embodiment of the present invention.

The acceleration sensor 1A preferably includes a piezoelectric element (detector element) 2 which is supported at both ends by a pair of substantially U-shaped support frames 10 and 11. The support frames 10 and 11 are preferably made of an electrically insulative ceramic having a thermal expansion coefficient almost equal to that of the piezoelectric element 2. The support frames 10 and 11 have spaces 10a and 11a within which the piezoelectric element 2 is deformed in response to acceleration G applied thereto.

The piezoelectric element 2 of the first preferred embodiment is manufactured preferably by laminating two thin, substantially rectangular piezoelectric layers 2a and 2b and by baking the laminate. Each layer may be as thin as or thinner than approximately 100 μm to increase charge sensitivity. Electrodes 3a and 3b are arranged between the layers 2a and 2b in the piezoelectric element 2, and electrodes 5a and 5b and electrodes 6a and 6b are arranged on top and bottom major surfaces of the piezoelectric element 2. Each of the two piezoelectric layers 2a and 2b is divided into three regions by two borders B1 and B2 at which stress in response to the application of the acceleration G is inverted. The regions respectively define six cells (1) through (6). All cells are preferably polarized in the same thickness direction. The polarization directions P are represented by solid arrow marks.

The interlayer electrodes 3a and 3b arranged in the longitudinal direction of the element are spaced from each other along the border B2. The interlayer electrode 3a continuously extends between the two cells (1) and (2) and the two cells (3) and (4). The interlayer electrode 3a is terminated with one end close to the left-hand end surface of the piezoelectric element 2, and with the other end near the border B2. The interlayer electrode 3b is arranged between the cells (3) and (6), and extends and terminated with one end near the border B2 and the other end routed to the right-hand end surface of the piezoelectric element 2.

The electrodes 5a and 5b on the top major surface of the piezoelectric element 2 are separated from each other along the border B1, and the electrodes 6a and 6b on the bottom major surface of the piezoelectric element 2 are separated from each other along the border B1. The electrodes 5a and 6a extend with each end routed to the left-hand end surface of the piezoelectric element 2 and the other ends terminated near the border B1. The electrodes 5b and 6b extend with ends close to the border B1 and with the other ends close to the right-hand end of the piezoelectric element 2. In other words, the major surface electrodes 5a and 6a are respectively disposed on the cells (1) and (4), and the major surface electrodes 5b and 6b are respectively disposed on the cells (2) and (3) and the cells (5) and (6).

External electrodes 7 and 8 are disposed on the longitudinal end surfaces of the piezoelectric element 2 and longitudinal end surfaces of the support frames 10 and 11. The external electrode 7 disposed on one end surface of the piezoelectric element 2 is electrically connected to the top major surface electrodes 5a and the bottom major surface electrode 6a, and the external electrode 8 disposed on the other end surface of the piezoelectric element 2 is electrically connected to the interlayer electrode 3b.

Figure 3:
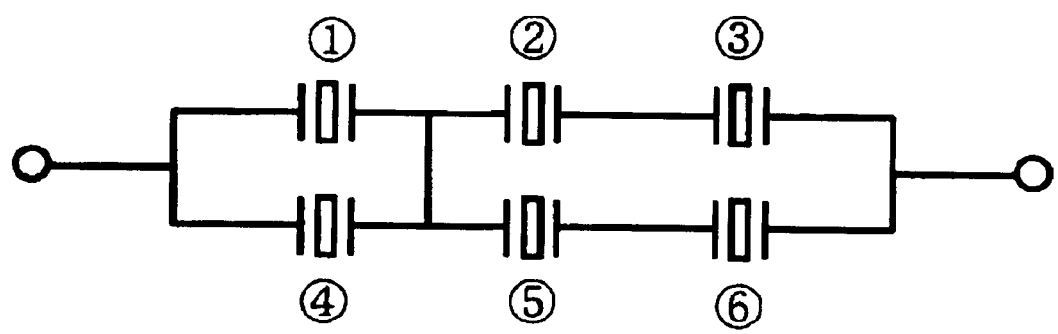
FIG. 3 is a circuit diagram of the acceleration sensor of FIG. 1.

A circuit shown in FIG. 3 is formed by arranging the interlayer electrodes 3a and 3b, top and bottom major surface electrodes 5a, 5b, 6a and 6b, and external electrodes 7 and 8. The three cells (1) through (3) arranged in the longitudinal direction are connected in series in the piezoelectric layer 2a and the three cells (4) through (6) arranged in the longitudinal direction are connected in series in the piezoelectric layer 2b. Furthermore, a connection of the cells (1) through (3) in the layer 2a and a connection of the cells (4) through (6) in the layer 2b are electrically connected in parallel.

Referring to FIG. 3, the node of the cell (1) and cell (2) and the node of the cell (4) through (5) are connected through the interlayer electrode 3a. Since the top and bottom piezoelectric layers 2a and 2b are symmetrical, the nodes have the same potential. Regardless of whether or not the nodes are connected, the circuit remains unchanged in characteristics thereof.

Figure 4:
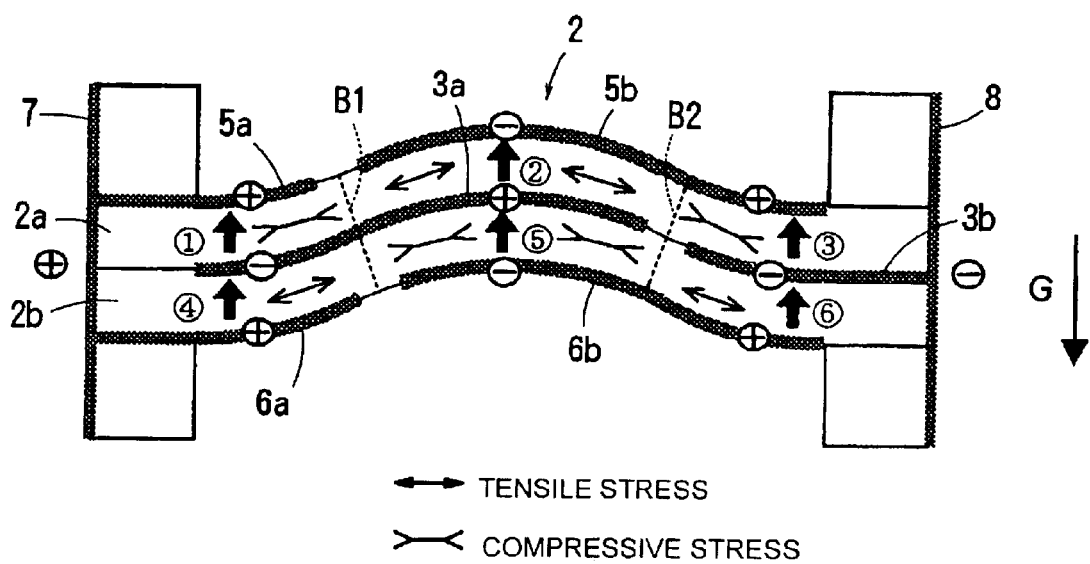
FIG. 4 illustrates operation of the acceleration sensor of FIG. 1 with acceleration G applied thereto.

FIG. 4 illustrates a charge that is generated when acceleration G acts on the acceleration sensor 1A.

If the acceleration G works in a downward direction as represented by an arrow shown in FIG. 4, a central portion of the piezoelectric element 2 is deformed to be convex in an upward direction through inertia. A tensile stress works on the central cell (2) of the top piezoelectric layer 2a, while a compressive stress works on the side cells (1) and (3). On the other hand, a compressive stress works on the central cell (5) in the bottom piezoelectric layer 2b, while a tensile stress works on the side cells (4) and (6). Depending on the relationship between the above-mentioned stress and the polarization direction P, a positive charge is generated in the one top major surface electrode 5a and a negative charge is generated in one portion of the other top major surface electrode 5b and a positive charge is generated in the other portion of the electrode 5b with the border B2 delineating the one portion from the other portion. A positive charge is generated in the one bottom major surface electrode 6a, and a negative charge is generated in one portion of the other bottom major surface electrode 6b and a positive charge is generated in the other portion of the electrode 6b with the border B2 delineating the one portion from the other portion. A negative charge is generated in one portion of the interlayer electrode 3a, and a positive charge is generated in the other portion of the interlayer electrode 3a with the border B1 delineating the one portion from the other portion. Generated charges in the electrodes 5b, 6b, and 3a cancel each other. A negative charge is generated in the interlayer electrode 3b.

As a result, the positive charge is picked up through the external electrode 7 connected to the electrodes 5a and 6a, and the negative charge is picked up through the external electrode 8 connected to the interlayer electrode 3b.

The piezoelectric element 2 is preferably manufactured in the following manner.

Figure 2:
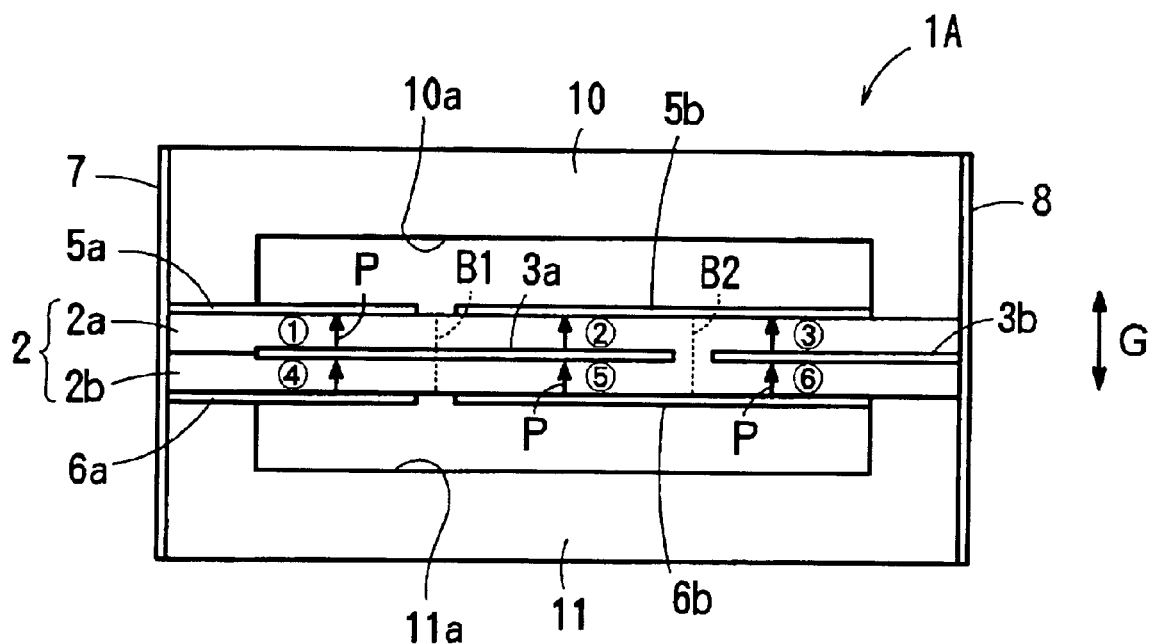
FIG. 2 is a front view of the acceleration sensor of FIG. 1.

Two layers of piezoelectric ceramic as green sheets are prepared. Electrode paste for defining the interlayer electrodes 3a and 3b is printed on one green sheet, and then, the other green sheet is compression bonded onto the one green sheet. The laminate is baked. Electrode paste is then printed to define the major surface electrodes 5a, 5b, 6a, and 6b, and is then subjected to baking. Predetermined voltages are applied between the major surface electrodes and between each of the major surface electrodes and the interlayer electrode for the polarization process. To use the interlayer electrodes 3a and 3b in the polarization process, the interlayer electrode 3a may be outwardly routed in a direction that is substantially perpendicular to the page of FIG. 2 although no such routing is shown in FIG. 2. By cutting a two-layered ceramic plate into substrates having a predetermined size, the piezoelectric element 2 is obtained.

In another manufacturing method, the interlayer electrodes and the major surface electrodes are printed on two already baked ceramic plates. The ceramic plates are then baked, and then bonded together using an adhesive agent.

Table 2 lists electrical characteristics of the independent cells (1) through (6) when acceleration is applied thereto.

The cells have the same voltage sensitivity V generated therewithin, and the area of each of the central cells (2) and (5) is almost twice as large as that of the side cells (1), (3), (4), and (6). The cells (2) and (5) thus have a charge sensitivity Q that is about twice as large as that of the side cells (1), (3), (4), and (6), and capacitance C that is about twice as large as that of the side cells (1), (3), (4), and (6). Since energy is E=VQ/2, the energy of the cells (2) and (5) is about twice the energy of the other cells.

TABLE 2

| Characteristics | Cells (1), (3), (4), and (6) | Cells (2) and (5) |
| --- | --- | --- |
| Voltage sensitivity | 1 V | 1 V |
| Charge sensitivity | 1 Q | 2 Q |
| Capacitance | 1 C | 2 C |
| Energy | 1 E | 2 E |

Figure 8A:
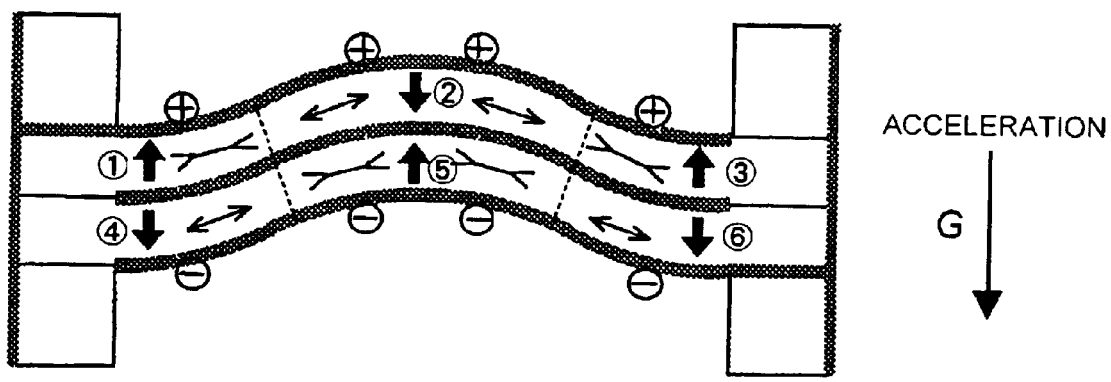
FIG. 8A illustrates operation of a conventional acceleration sensor under acceleration.
Figure 8B:
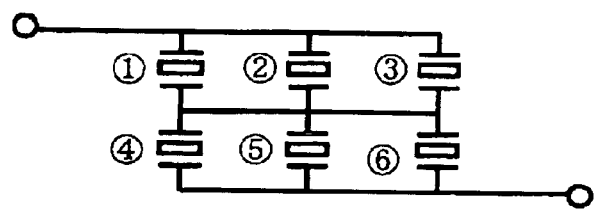
FIG. 8B illustrates a circuit diagram of the conventional acceleration sensor.
Figure 9A:
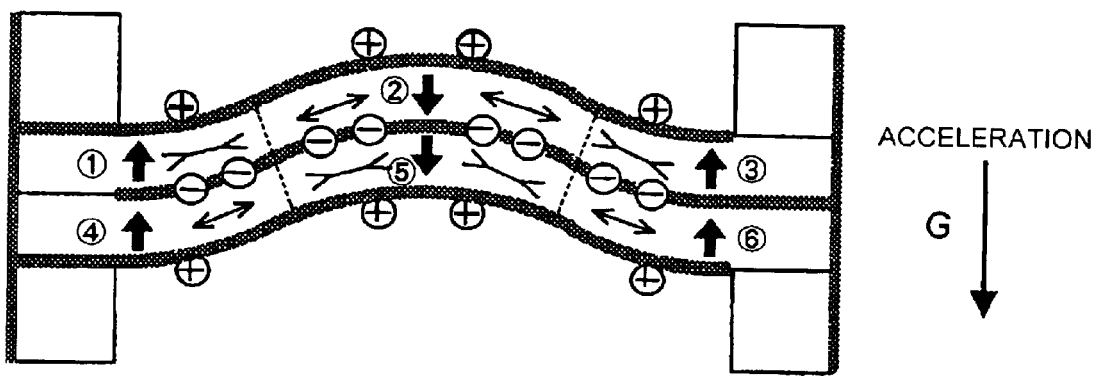
FIG. 9A illustrates operation of another conventional acceleration sensor under acceleration.
Figure 9B:
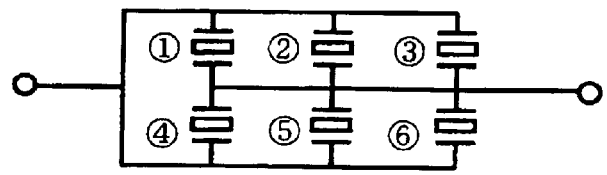
FIG. 9B illustrates a circuit diagram of the conventional acceleration sensor.
Figure 10:
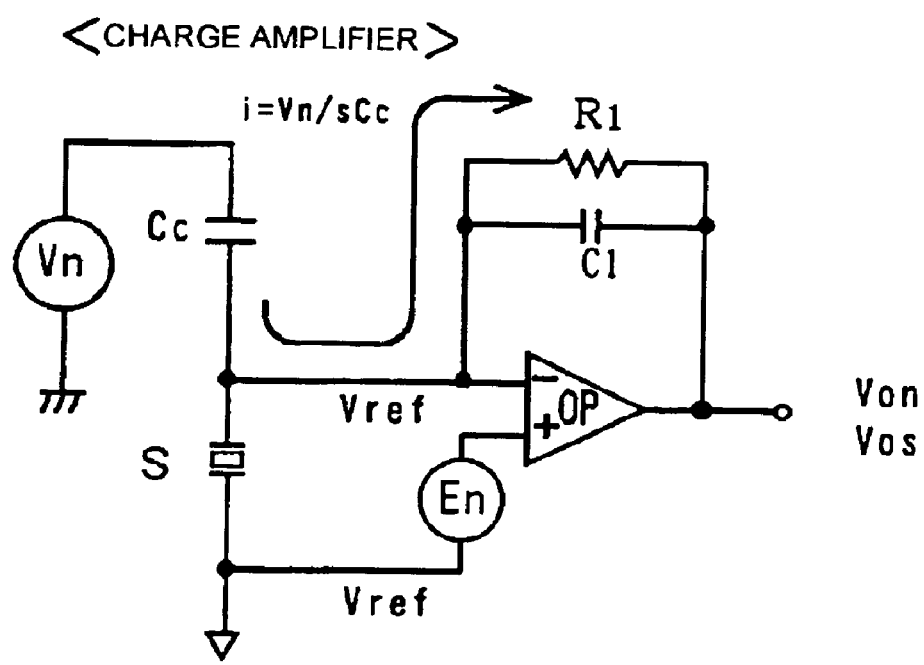
FIG. 10 is a circuit diagram of a charge amplifier.
Figure 11:
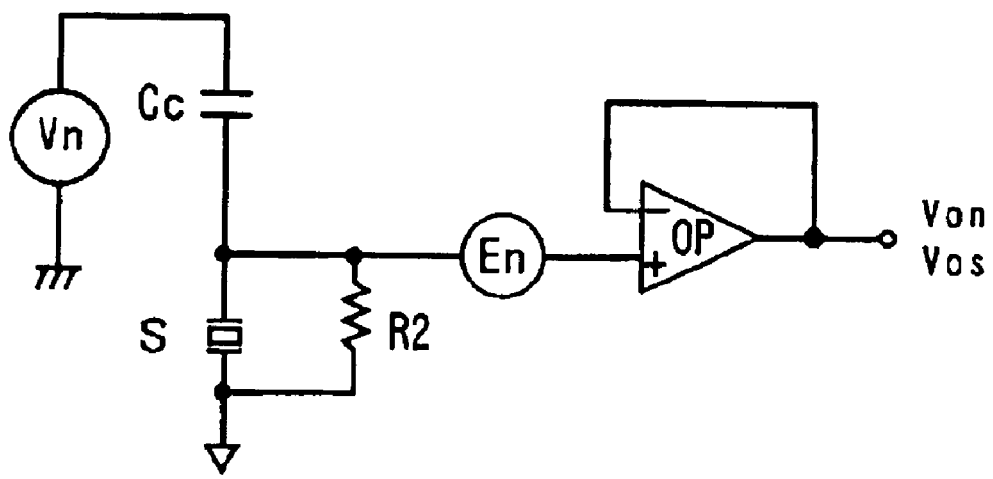
FIG. 11 is a circuit diagram of a voltage amplifier.

Table 3 lists, for comparison, the voltage sensitivity, charge sensitivity, capacitance, and energy of the conventional acceleration sensors shown in FIGS. 8A and 9A, the acceleration sensor 1A of the first preferred embodiment of the present invention, and an acceleration sensor 1B of a second preferred embodiment to be discussed later.

TABLE 3

| Characteristics | Conventional sensor (FIG. 8A) | Conventional sensor (FIG. 9A) | First embodiment | Second embodiment |
| --- | --- | --- | --- | --- |
| Voltage sensitivity | 2 V | 1 V | 3 V | 6 V |
| Charge sensitivity | 4 Q | 8 Q | 2.4 Q | 1.2 Q |
| Capacitance | 2 C | 8 C | 0.8 C | 0.2 C |
| Energy | 4 E | 4 E | 3.6 E | 3.6 E |

As understood from Table 3, the three cells (1), (2), and (3) are serially connected in the piezoelectric layer 2a, and the three cells (4), (5), and (6) are serially connected in the piezoelectric layer 2b in the acceleration sensor 1A. The voltages in the cells are thus summed, and the generated voltage in each layer is increased. The voltage sensitivity is thus increased to be about 1.5 times to about 3 times as high as that in the parallel connection type (see FIGS. 8A and 9A). In connection with the energy, the first preferred embodiment obtains about 3.6 E while the conventional sensors obtain about 4E. The difference therebetween is not significant. The acceleration sensor 1A of the first preferred embodiment increases the voltage sensitivity in the sensitivity characteristics while controlling a decrease in the generated energy. The present invention thus provides an acceleration sensor which is appropriate for use in an operating environment where internal noise is high in level.

The major surface electrodes and the interlayer electrodes face each other with the piezoelectric layers 2a and 2b interposed therebetween. The thickness of each of the piezoelectric layers 2a and 2b is preferably as thin as about 100 μm. The characteristics that take into consideration the effect of the shape including the thickness are expressed as follows:

Charge sensitivity $Q = kd \cdot WL^3/T$

Voltage sensitivity $V = kg \cdot L^2$ where L is the length between supported points of the support frames, W is the width of the detector element, T is the thickness of the detector element, g and d are piezoelectric constants, and k is a coefficient.

As understood from the above equations, the thinner the piezoelectric element, the higher the charge sensitivity. Since the voltage sensitivity is not related to the thickness of the piezoelectric element, the thinner the element, the higher the energy becomes. A thinner design of the element contributes to the manufacturing of a high-sensitivity sensor. On the other hand, insulation must be provided by maintaining a gap, corresponding to the thickness of the piezoelectric layer, between the major surface electrode and the interlayer electrode on the side of the piezoelectric element. If the thickness of the piezoelectric layer is too small, sufficient resistance between the electrodes is not assured. Reduction in insulation between the electrodes does not occur uniformly on the entire end surface of the element but in a localized position where impurity that is mixed during a process typically reacts with moisture ingressing into a package surrounding the detector element.

In this preferred embodiment, the three cells are connected in series in each layer. Even if a particular cell is degraded in insulation, the remaining two maintain insulation. The degree of degradation is thus reduced. Even if one single cell is completely shorted, two-thirds of the overall insulation of the cells is still assured. As the insulation requirement is reduced, the thickness of the piezoelectric layer is reduced and sensitivity is increased.

In the conventional sensors (shown in FIGS. 8A and 8B and FIGS. 9A and 9B), the polarization direction must be inverted at the border between the three regions arranged in the longitudinal direction. During the polarization process, an external electrode is split into three regions, voltages corresponding to the polarization directions are applied, and the external electrodes are then connected. Since the polarization directions in the length of the element are the same in this preferred embodiment, the top and bottom major surface electrodes are formed in the final form thereof, and then the polarization is achieved using the major surface electrodes. The ease of production of the sensor is thus increased, and the manufacturing costs of the sensor are reduced.

Figure 5:
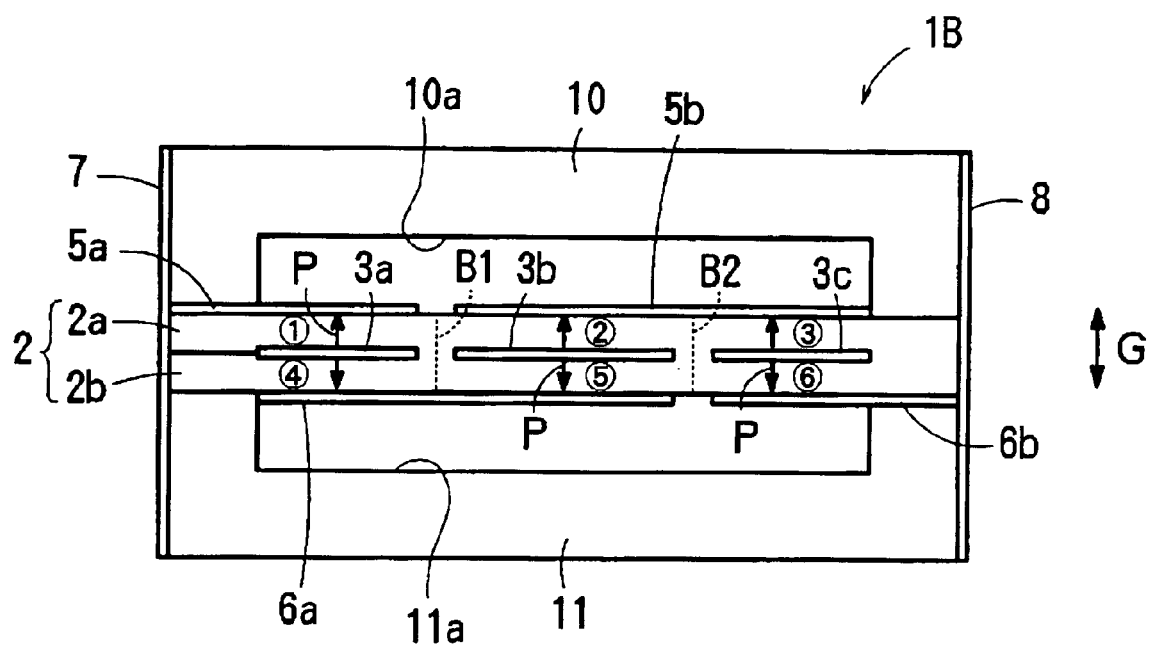
FIG. 5 is a front view of the acceleration sensor in-accordance with a second preferred embodiment of the present invention.
Figure 6:
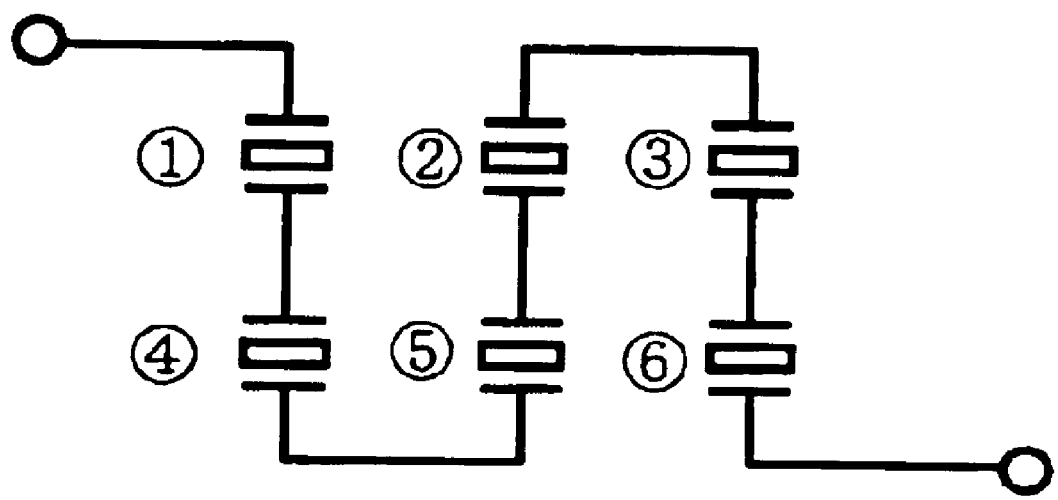
FIG. 6 is a circuit diagram of the acceleration sensor of FIG. 5.
Figure 7:
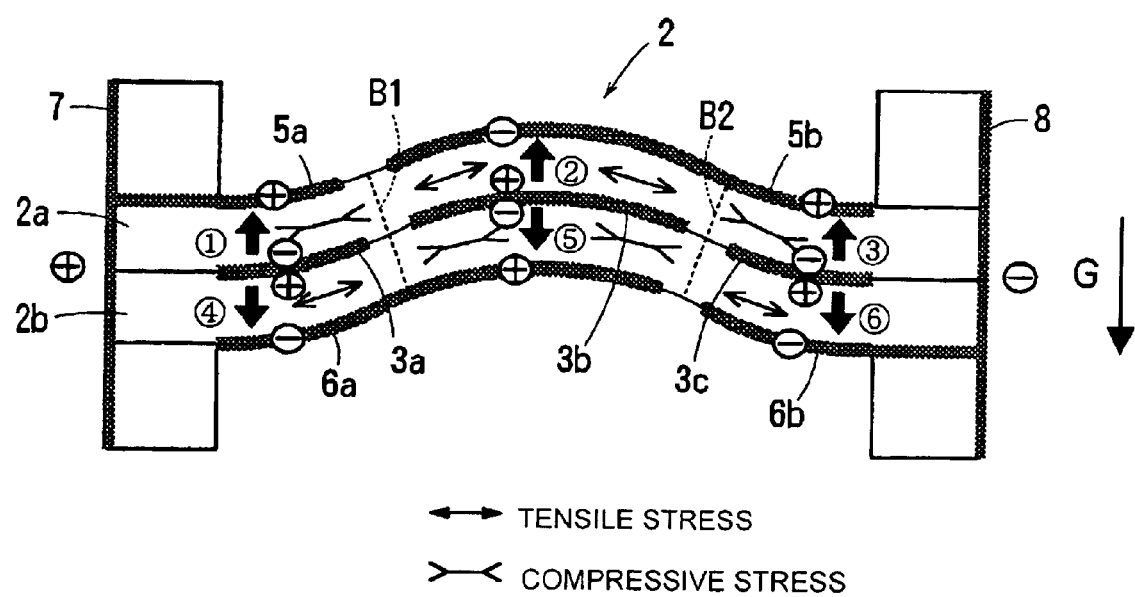
FIG. 7 illustrates operation of the acceleration sensor of FIG. 5 with acceleration G applied thereto.

FIGS. 5 through 7 illustrate an acceleration sensor 1B in accordance with a second preferred embodiment of the present invention.

In the acceleration sensor 1B of the second preferred embodiment, the polarization directions of the two piezoelectric layers 2a and 2b defining the piezoelectric element 2 are inverted. Three separate interlayer electrodes are used. Bottom major surface electrodes 6a and 6b are point-symmetrical with top major surface electrodes 5a and 5b. Components that are identical to those in the first preferred embodiment are designated with the same reference numerals, and the discussion thereof is omitted here.

The interlayer electrodes 3a, 3b, and 3c arranged in the longitudinal direction are separated along borders B1 and B2. None of the interlayer electrodes 3a, 3b, and 3c is routed to the longitudinal end surfaces of the piezoelectric element 2, and none of the interlayer electrodes 3a, 3b, and 3c is connected to the external electrodes 7 and 8.

The major surface electrodes 5a and 5b arranged on the major surface in the longitudinal direction are separated along the border B1. The electrode 5a extends with one end thereof routed to the left end surface of the piezoelectric element 2 and the other end terminated near the border B1. The electrode 5b extends with one end thereof terminated near the border B1 and the other end thereof terminated near the right hand end surface of the piezoelectric element 2.

The bottom major surface electrodes 6a and 6b arranged in the longitudinal direction are separated along the border B2. The major surface electrode 6a extends with one end thereof terminated near the left hand end surface of the piezoelectric element 2 and the other end terminated near the border B2. The major surface electrode 6b extends with one end thereof terminated near the border B2 and the other end thereof routed to the right hand end surface of the piezoelectric element 2. To pick up the charge generated in the piezoelectric element 2, the top major surface electrode 5a is connected to the external electrode 7, and the bottom major surface electrode 6b is connected to the external electrode 8.

The six cells (1) through (6) are connected in series as shown in FIG. 6.

When acceleration G acts on the acceleration sensor 1B, a tensile stress occurs in the central cell (2) in the top piezoelectric layer 2a, and a compressive stress occurs in the side cells (1) and (3). A compressive stress occurs in the central cell (5) in the bottom piezoelectric layer 2b, while a tensile stress occurs in the side cells (4) and (6). Depending on the relationship between the above-mentioned stress and the polarization direction P, a positive charge is generated in the one top major surface electrode 5a and a negative charge is generated in one portion of the other top major surface electrode 5b and a positive charge is generated in the other portion of the electrode 5b with the border B2 delineating the one portion from the other portion. A negative charge is generated in one portion of the one bottom major surface electrode 6a and a positive charge is generated in the other portion of the electrode 6a with the border B1 delineating the one portion from the other portion, and a negative charge is generated in the other bottom major surface electrode 6b. A positive charge and a negative charge generated in each of the electrodes 3a, 3b, and 3c cancel each other.

As a result, the positive charge is picked up through the external electrode 7 connected to the electrodes 5a and 6a, and the negative charge is picked up through the external electrode 8 connected to the electrode 6b.

All cells (1) through (6) are serially connected in the acceleration sensor 1B of the second preferred embodiment. As listed in Table 3, the voltage sensitivity of the second preferred embodiment is about 6 V, which is higher than not only the conventional sensors but also the sensor of the first preferred embodiment. In connection with the energy, the second preferred embodiment achieves about 3.6E while the conventional sensors achieve about 4E. The difference therebetween is not significant. The acceleration sensor 1B of the second preferred embodiment increases the voltage sensitivity in the sensitivity characteristics while controlling a decrease in the generated energy.

As in the first preferred embodiment, a cell having a degraded insulation does not affect the other cells in the second preferred embodiment. The performance degradation is thus controlled. Specifically, since the effect of reduced insulation is alleviated, thinner piezoelectric layers 2a and 2b work. A high-sensitivity acceleration sensor is thus provided.

Since the three cells in each of the layers 2a and 2b have the same polarization directions, the polarization is easy to achieve.

The present invention is not limited to the above-described preferred embodiments.

The polarization directions P of the piezoelectric layers 2a and 2b face away from each other in the acceleration sensor 1B as shown in FIG. 5. If the polarization directions P of the piezoelectric layers 2a and 2b are set to face each other, the present invention operates in the same way, and provides the same advantages. But the polarity of the generated charge becomes opposite.

The acceleration sensors 1A and 1B may be formed of three or more layers.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. An acceleration sensor comprising:

a piezoelectric element; and a support member for supporting the piezoelectric element at both longitudinal ends thereof; wherein the piezoelectric element includes a laminate of at least two piezoelectric layers;

each of the at least two piezoelectric layers of the piezoelectric element includes three longitudinally aligned regions separated at two borders where stress is inverted in the longitudinal direction of the piezoelectric element when acceleration is applied;

a plurality of cells each being defined by a respective region in the at least two piezoelectric layers, the plurality of cells being polarized in the same direction of thickness in each of the two piezoelectric layers; and electrodes are arranged on top and bottom major surfaces of and between the at least two piezoelectric layers of the piezoelectric element so that the three longitudinally aligned cells are electrically connected in series.

2. An acceleration sensor according to claim 1, wherein all cells of the at least two piezoelectric layers are polarized in the same direction, each of the electrodes on the top and bottom major surfaces of the piezoelectric element includes two longitudinally aligned portions separated at one of the two borders, the electrode between the at least two piezoelectric layers of the piezoelectric element includes two longitudinally aligned portions separated at the other of the two borders, and at least one of the electrode on the top and bottom major surfaces is lead out to one of the longitudinal ends of the piezoelectric element, and the electrode between the piezoelectric layer is lead out to the other of the longitudinal ends of the piezoelectric element.

3. An acceleration sensor according to claim 1, wherein one of the cells of a first of the at least two piezoelectric layers and one of the cells of a second of the at least two piezoelectric layers are polarized in opposite directions, the electrode on the top major surface of the piezoelectric element includes two longitudinally aligned portions separated at one of the two borders, the electrode on the bottom major surface of the piezoelectric element includes two longitudinally aligned portions separated at the other of the two borders, the electrode between the piezoelectric layers of the piezoelectric element includes three longitudinally aligned portions separated at the two borders, and the electrode on the top major surface is lead out to one of the longitudinal ends of the piezoelectric element, and the electrode on the bottom major surface is lead out to the other of the longitudinal ends of the piezoelectric element.

4. An acceleration sensor according to claim 1, wherein the support member includes a pair of substantially U-shaped support frames.

5. An acceleration sensor according to claim 4, wherein a space is defined between the pair of substantially U-shaped support frames to allow for deformation of the piezoelectric element.

6. An acceleration sensor according to claim 1, wherein each of the at least two piezoelectric layers has a thickness of about approximately 100 $\mu$m or less.

7. An acceleration sensor according to claim 1, further comprising electrodes disposed between the at least two piezoelectric layers so as to define interlayer electrodes.

8. An acceleration sensor according to claim 7, wherein the interlayer electrodes are arranged in the longitudinal direction of the piezoelectric element and are spaced from each other along one of the two borders.

9. An acceleration sensor according to claim 7, wherein the plurality of cells are connected through at least one of the interlayer electrodes.

10. An acceleration sensor according to claim 7, wherein there are at least three interlayer electrodes.

11. An acceleration sensor according to claim 1, wherein the electrodes arranged on the top major surface of the piezoelectric element are separated from each other along one of the two borders, and the electrodes arranged on the bottom major surface of the piezoelectric element are separated from each other along the one of the two borders.

* * * * *